United States Patent [19]  [11] Patent Number: 4,972,593
Dahlen et al.  [45] Date of Patent: Nov. 27, 1990

[54] METHOD AND APPARATUS FOR MEASURING THE UNDISTORTED MAGNETIC FIELD OF THE EARTH

[75] Inventors: John M. Dahlen, Duxbury; James R. Scholten, Sudbury; John T. Shillingford, Jr., Milton, all of Mass.

[73] Assignee: The Charles Stark Draper Laboratory, Inc., Cambridge, Mass.

[21] Appl. No.: 297,883

[22] Filed: Jan. 17, 1989

[51] Int. Cl.⁵ .............................................. G01C 17/38
[52] U.S. Cl. ........................................ 33/356; 33/361
[58] Field of Search ......................... 33/361, 356, 357; 324/225, 244, 247

[56] References Cited

U.S. PATENT DOCUMENTS 4,327,498  5/1982  Setter et al. .................. 33/361 X
4,720,992  1/1988  Hormel ......................... 33/361 X
4,729,172  3/1988  Alberter et al. ............... 33/361 X

FOREIGN PATENT DOCUMENTS 2128749  5/1984  United Kingdom .............. 33/361

Primary Examiner—Harry N. Haroian
Attorney, Agent, or Firm—Lahive & Cockfield

[57] ABSTRACT

The present invention is a magnetic field measuring system and method for generating a magnetic field signal representative of the Earth's undistorted magnetic field at any given spatial location over a measurement period. The measured undistorted magnetic field is substantially independent of distortions due to any magnetically susceptible material within the measuring system and is substantially independent of internal magnetic fields generated by magnetic field sources within the system.

16 Claims, 1 Drawing Sheet

METHOD AND APPARATUS FOR MEASURING THE UNDISTORTED MAGNETIC FIELD OF THE EARTH

BACKGROUND OF THE INVENTION

This invention relates to magnetic field measuring devices and methods and more particularly, to compasses and systems that reference the Earth's magnetic field vector.

Magnetic field measuring devices are used to determine the Earth's magnetic field vector at a particular geographic location. The accurate characterization of the Earth's magnetic field is dependent upon the measuring device's ability to compensate for the magnetically susceptible material and magnetic sources that may be contained within the device itself or the vehicle supporting the device. Thus, the ability of the measuring device to report an accurate representation of the undistorted field is dependent upon the method utilized to compensate for local distributions of magnetically susceptible material and local magnetic sources within the device or vehicle supporting the device.

The primary shortcoming of the prior art is the inability to accurately compensate for the change in the local magnetic field due to local distributions of magnetically susceptible material in the vehicle supporting the magnetic field measuring device. The magnitude and direction of the Earth's magnetic field varies with geographic location. Of particular importance is the dip angle, the angle between the field vector and the horizontal plane. Distortions due to magnetically susceptible material in the vehicle depend upon field strength and direction relative to the vehicle reference frame. Thus distortion of the Earth's magnetic field due to local distributions of magnetically susceptible material in the supporting vehicle varies with respect to geographic location and vehicle orientation. The prior art uses calibration methods to compensate a magnetic field measuring device for the distortions encountered at a particular geographical location over a limited range of vehicle orientations. As a result, when the vehicle assumes an orientation not tried in the calibration procedure, or when the measuring device is transported by the vehicle to a geographic location which differs from the location where the instrument was calibrated, new and unknown compensation factors are required to obtain the undistorted field. Thus, the accuracy of the device in characterizing the magnetic field is unpredictable at untried vehicle orientations and at locations outside the immediate calibration area.

The present invention overcomes the aforementioned short comings by measuring the total field vector, by calibrating over a sufficient range of vehicle orientations, and by processing data through an accurate mathematical model of the physical process involved.

It is an object of the present invention to provide an improved method and apparatus for measuring the Earth's magnetic field from within a vehicle or other support system for the measuring device. Presently the most practical application is a compass for aircraft, ships, boats, land vehicles and various instruments.

Another object is to provide an apparatus and method for compensating for inaccuracies in measuring the Earth's magnetic field due to materials within the supporting vehicle.

Still another object is to provide a measurement of the Earth's magnetic field which is independent of changes in the localized magnetic field due to local distributions of magnetically susceptible material and independent magnetic sources.

BRIEF DESCRIPTION OF DRAWINGS

The foregoing and other objects of this invention, the various features thereof, as well as the invention itself, may be more fully understood from the following description, when read together with the accompanying drawings in which.

SUMMARY OF THE INVENTION

The present invention is a magnetic field measuring system and method for generating a magnetic field signal representative of the undistorted magnetic field at any given spatial location over a measurement period. The measured undistorted magnetic field is substantially independent of distortions due to any magnetically susceptible material within the measuring system and is substantially independent of internal magnetic fields generated by magnetic field sources within the system. Such magnetically susceptible material may have susceptibility either greater or less than zero, and may include iron or other materials having similar magnetic characteristics.

The measuring system includes a sensor and a signal processor. The sensor generates a signal representative of the magnetic field measured at the spatial location, where that measured magnetic field corresponds to the magnetic field as distorted by magnetically susceptible materials within the measuring system and by internally generated magnetic fields.

The signal processor is coupled to the measurement apparatus, and processes the signal therein from the sensor to generate the undistorted magnetic field signal.

The signal processor generates a signal representative of distortions to the magnetic field due to internally generated magnetic fields, and of distortions to the magnetic field due to magnetically susceptible materials in the magnetic field measuring The signal processor is further adapted to evaluate the relationship:

$$\{b\} = [B]^{-1} \{h - e\}$$

where:

{b} is a matrix representation of the undistorted magnetic field at the spatial location;

{h} is a matrix representation of the measured magnetic field at the spatial location;

{e} is a matrix representation of distortions in the magnetic field at the location due to magnetic fields generated by sources internal to the system;

[B] is a matrix representation of distortions in the magnetic field at the location due to magnetically susceptible materials in the measuring system.

The magnetic field measuring system is operative over the measurement period at the spatial location under conditions where the distribution of magnetically susceptible material within the magnetic field measuring system, and the number, location and intensity of internal magnetic sources, are substantially constant over the measuring period.

In the preferred form of the invention, the sensor provides three signals, each being representative of the distorted magnetic field along a respective one of three substantially orthogonal axes at the spatial location. The sensor may include separate signal generators for each of the three signals. The respective signal generators may be magnetometers having their sensing axes arranged to be substantially orthogonal.

With this configuration, a highly accurate measurement of the Earth's magnetic field may be obtained, with minimal effects due to the measuring system itself.

GENERAL DESCRIPTION

Figure 1:
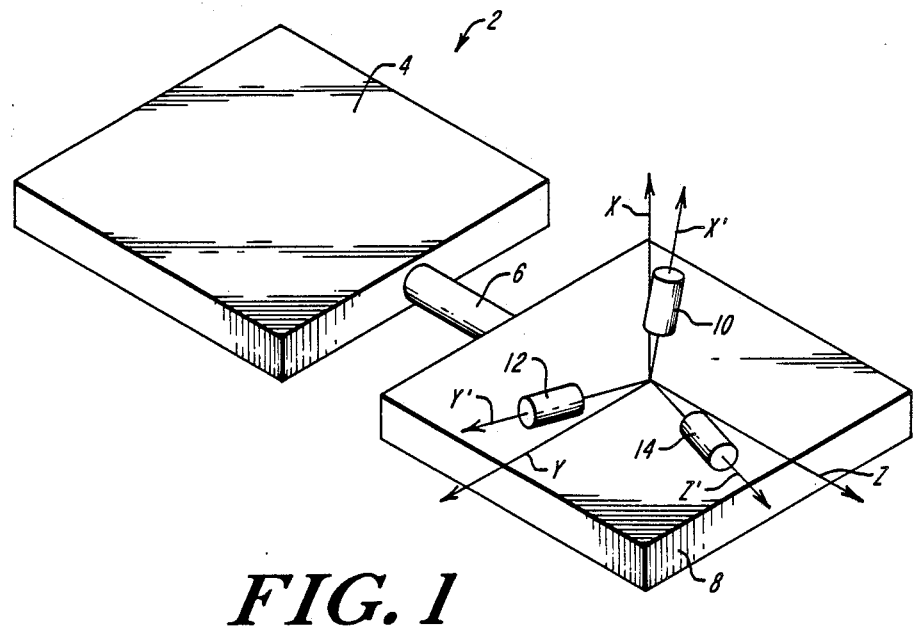
FIG. 1 is a perspective view in schematic form of the individual components of the measurement system in accordance with the present invention.

FIG. 1 shows the general assembly of the magnetic field measuring system 2 in accordance with the present invention. The magnetic field measuring system 2 includes a signal processing unit 4, a supporting vehicle 8 shown in reference to a cartesian coordinate system (x,y,z) containing a x-axis magnetometer 10, a y-axis magnetometer 12, and a z-axis magnetometer 14, a data bus 6 to transfer electrical signals from magnetometers 10, 12, and 14 to signal processing unit 4.

With continued reference to FIG. 1, the data bus 6 provides an electrical connection between magnetometers 10, 12, and 14 and microprocessor unit 20 (not shown) within signal processing unit 4. These electrical signals are a representation of the strength of the magnetic field sensed at each input of magnetometers 10, 12 and 14.

Figure 2:
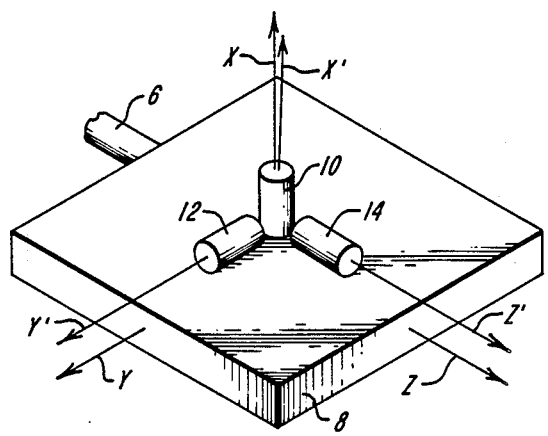
FIG. 2 is a perspective view in detail of the supporting vehicle referenced to the cartesian coordinates (x,y,z) and the magnetometers referenced to the cartesian coordinates (x',y',z') of the sensors of FIG. 1.

FIG. 2 depicts the two cartesian coordinate systems used in the invention. (x,y,z) reference the nominal axes of magnetic field measuring system 2 and (x',y',z') reference the input, or sensing, axis of magnetometer 10, the sensing axis of magnetometer 12, and the sensing axis of magnetometer 14, respectively. It should be noted that the three magnetometers could be replaced by any magnetometer sensor which senses the magnetic field components along three essentially orthogonal axes.

System 2 generates a signal representative of the true undistorted magnetic field of the Earth from the magnetic field sensed by the magnetometers after distortion by system 2. The method utilized to obtain the true undistorted magnetic field of the Earth compensates for the distortions due to the presence of system 2. The distortions of the Earth's magnetic field may be attributed to magnetically susceptible material, for example iron, within system 2, and/or independent magnetic sources which may be contained within system 2. Accordingly, system 2 provides an output signal which accurately characterizes the undistorted magnetic field of the Earth, independent of geographic location, altitude and orientation. Furthermore, the method utilized by system 2 negates dependence of the accuracy of the magnetic measurements on the calibration location, altitude and orientation.

A development of the magnetic field modeling utilized by system 2 to characterize Earth's undistorted magnetic field follows.

The Earth's distorted magnetic field may be modeled in the form:

$$\{h\} = [B]\{b\} + \{e\} \quad (1)$$

where:

$\{h\}$ is a column matrix representation of the Earth's distorted magnetic field at the locations of the magnetometers 10, 12, and 14:

$\{b\}$ is a column matrix representation of the Earth's undistorted magnetic field:

$[B]$ is a square matrix that accounts for the distortions of the Earth's magnetic field at the locations of the magnetometers due to magnetically susceptible material in system 2:

$\{e\}$ is a column matrix representation of the distortions of the Earth's magnetic field at the locations of the magnetometers due to independent magnetic field sources contained in system 2.

$[B]$ and $\{e\}$ remain substantially constant regardless of geographic location, altitude and orientation of system 2, provided that the distribution of magnetically susceptible material within the system remains constant and provided that the number, location, orientation and intensity of the independent magnetic sources remain constant.

With reference to FIG. 2, the magnetometer input axes (x',y',z') generally are not exactly aligned with respect to the orthogonal axes (x,y,z) of instrument 2; these axes (x',y',z'), are not quite orthogonal as a result of hardware inaccuracies in system 2. Also the magnetometers must be physically separated from each other. These non-idealities are incorporated into the Earth's magnetic field distortion model (Equation 1), as shown below in Equations 2, 3, and 4, the expanded characterization of Equation 1. System 2 compensates for these non-idealities; thus rendering system 2 further independent from the accuracy of the hardware of system 2. In the tests conducted to prove the validity of the equations and procedures described herein, deviations of the magnetometer input axes (x',y',z') from the system axes (x,y,z) were less than 5 degrees and the magnetometers were mounted in close proximity to each other.

x-magnetometer
$$\text{input} = h_{x'}{}^x = B_{11}b_x + B_{12}b_y + B_{13}b_z + e_{x'}{}^x \quad (2)$$

y-magnetometer
$$\text{input} = h_{y'}{}^y = B_{21}b_x + B_{22}b_y + B_{23}b_z + e_{y'}{}^y \quad (3)$$

z-magnetometer
$$\text{input} = h_{z'}{}^z = B_{31}b_x + B_{32}b_y + B_{33}b_z + e_{z'}{}^z \quad (4)$$

where:

$h^x$, $h^y$ and $h^z$ are the magnetic field intensity vectors at the locations of the x,y,z magnetometers, respectively, and $e^x$, $e^y$ and $e^z$ are those parts of $h^x$, $h^y$ and $h^z$, respectively, due to the magnetic field sources in system 2, and $l_{x'}$, $l_{y'}$ and $l_{z'}$ are unit vectors along the x', y' and z' axes, respectively, and b is the undistorted Earth's magnetic field intensity vector at the measurement location, and where: $h_{x'}{}^x = h^x \cdot l_{x'}$; $h_{y'}{}^y = h^y \cdot l_{y'}$; $h_{z'}{}^z = h^z \cdot l_{z'}$; $e_{x'}{}^x = e^x \cdot l_{x'}$; $e_{y'}{}^y = e^y \cdot l_{y'}$; $e_{z'}{}^z = e^z \cdot l_{z'}$;

An overview of the experimental calibration procedure utilized by system 2 to determine $[B]$ and $\{e\}$ follows.

$b_{cp}$ is defined as the undistorted earth field strength vector in the location where system 2 is calibrated. The direction of this vector must be determined approximately through an conventional technique apparent to those skilled in the art. Furthermore, the procedure utilized to obtain $[B]$ and $\{e\}$ must be performed in a calibration location where the magnetic field vector at that location, $b_{cp}$, is constant throughout the system volume.

In the illustrated embodiment, the individual magnetometers 10, 12, and 14 are generally calibrated outside system 2 at a location where the magnetic field strength, $b_{cm}$, is identical for all three magnetometers. This condition facilitates the procedure of determining the values of [B] and {e}.

Data processing unit 4 applies the individual magnetometer formulas to the voltage outputs of magnetometers 10, 12, and 14 to generate $\{h/b_{cm}\}$, the measured distorted magnetic field scaled with respect to the field strength, $b_{cm}$, where the magnetometers were individually calibrated. Thus, the processed voltage outputs of magnetometers 10, 12, and 14 are:

magnetometer 10: $h_x{}^x/b_{cm}$
magnetometer 12: $h_y{}^y/b_{cm}$
magnetometer 14: $h_z{}^z/b_{cm}$ A unit vector along the undistorted magnetic field is $b/b_{cp}$. The matrix form of this unit vector is $\{b/b_{cp}\}$. Thus, defining $[A] \equiv (b_{cp}/b_{cm})[B]$ Equation 1 may be written:

$$\{h/b_{cm}\} = [A]\{b/b_{cp}\} + \{e/b_{cm}\} \quad (5)$$

Eq (5) is the form used in the calibration procedure, whose object now is to obtain [A] and $\{e/b_{cm}\}$. By orienting the system in four independent attitudes in which $\{b/b_{cp}\}$ is known and $\{h/b_{cm}\}$ is measured, 12 will be obtained from which [A] and $\{e/b_{cm}\}$ may be calculated. We have found it more practical to use six cardinal attitudes. These attitudes sequentially align the axes of system 2 parallel to the predetermined direction of the Earth's magnetic field. Selecting alignment attitudes in this particular manner provides a computational advantage which will be evident. The cardinal attitudes provide a further benefit.

Generally it is very difficult to find the precise direction of $b_{cp}$. A reduction in the error due to misalignment of the system axes with $b_{cp}$ is accomplished by rotating the system around the axis that is supposed to be aligned to the direction of $b_{cp}$. Then $\{h/b_{cm}\}$ is found from the average magnetometer outputs over exactly one revolution. An illustration of the advantages of using the average magnetometer outputs over one revolution are detailed below for the z-axis of system 2:

(1) $b_x$ and $b_y$ are oscillatory with zero mean and their contributions in each of the three equations (Equations (2), (3), and (4)) are eliminated,
(2) $b_z/b_{cp}$ is slightly less than 1 which to a slight error that may be neglected if the z axis orientation is adjusted to produce the maximum output of magnetometer 14, $h_z{}^z/b_{cm}$, and the misalignment between z and z' is small.

Similarily, the relationships, detailed above for the z-axis, are identical for the x-axis and y-axis when each is aligned to the direction of the Earth's magnetic field $b_{cp}$ in the instrument calibration location.

With the knowledge of [A] and $\{e/b_{cm}\}$ for system 2, signal processing unit 4 performs the necessary matrix multiplication to obtain the local undistorted Earth magnetic field vector represented by $\{b/b_{cp}\}$ from the measured Earth's distorted magnetic field represented by $\{h/b_{cm}\}$. In the present embodiment, signal processing unit 4 utilizes a programmed microprocessor unit 20 to perform the matrix multiplication:

$$\{b/b_{cp}\} = [A]^{-1}\{h/b_{cm} - e/b_{cm}\}$$

to solve for $\{b/b_{cp}\}$, the matrix representation of the local undistorted Earth's magnetic field vector.

A detailed description of the procedure utilized by system 2 to calculate [A] follows.

In the present embodiment, system 2 is first oriented so that its z axis is aligned with $b_{cp}$. As described above, under this condition $b_z = b_{cp}$ and $b_x = b_y = 0$; thus equation (5) reduces to:

$$h_x{}^x/b_{cm} = A_{13} + e_x{}^x/b_{cm}$$

$$h_y{}^y/b_{cm} = A_{23} + e_y{}^y/b_{cm}$$

$$h_z{}^z/b_{cm} = A_{33} + e_z{}^z/b_{cm}$$

For reasons detailed above, system 2 is rotated about the z-axis and the average outputs of magnetometers 10, 12, and 14 are used. Data processing unit 4 applies the outputs of magnetometers 10, 12, and 14 to their respective individual magnetometer formulas to generate the elements of $\{h/b_{cm}\}$.

System 2 is next rotated 180° to align its z-axis with $-b_{cp}$ and equation (5) thus reduces to:

$$h_x{}^x/b_{cm} = -A_{13} + e_x{}^x/b_{cm}$$

$$h_y{}^y/b_{cm} = -A_{23} + e_y{}^y/b_{cm}$$

$$h_z{}^z/b_{cm} = -A_{33} + e_z{}^z/b_{cm}$$

Again signal processing unit 4 generates the elements of $\{h/b_{cm}\}$ from the average magnetometer outputs over exactly one revolution.

Utilizing the values of $\{h/b_{cm}\}$ generated for the two z-axis alignment positions, signal processing unit 4 solves the six equations simultaneously to obtain values for the six unknowns:

$A_{13}, A_{23}, A_{33}, e_x{}^x/b_{cm}, e_y{}^y/b_{cm}, e_z{}^z/b_{cm}$

System 2 is next oriented with its x axis aligned with $\pm b_{cp}$ creating the situation of $b_x = \pm b_{cp}$ and $b_z = b_y = 0$. Thus, equation 5 reduces to:

$$h_x{}^x/b_{cm} = \pm A_{11} + e_x{}^x/b_{cm}$$

$$h_y{}^y/b_{cm} = \pm A_{21} + e_y{}^y/b_{cm}$$

$$h_z{}^z/b_{cm} = \pm A_{31} + e_z{}^z/b_{cm}$$

The average magnetometer outputs calculated by signal processing unit 4 from the magnetic field sensed by magnetometers 10, 12, and 14 over exactly one revolution are used by signal processing unit 4 in the equations above to solve for the coefficients $A_{11}, A_{21}, A_{31}$, and $\{e/b_{cm}\}$. Note, determination of $\{e/b_{cm}\}$ supplies redundant information.

System 2 is next oriented with its y axis aligned with $\pm b_{cp}$ producing the situation of $b_y = \pm b_{cp}$ and $b_z = b_x = 0$. Thus Equation 5 reduces to:

$$h_x{}^x/b_{cm} = \pm A_{12} + e_x{}^x/b_{cm}$$

$$h_y{}^y/b_{cm} = \pm A_{22} + e_y{}^y/b_{cm}$$

$$h_z{}^z/b_{cm} = \pm A_{32} + e_z{}^e/b_{cm}$$

The average magnetometer outputs calculated by signal processing unit 4 from the magnetic field sensed by magnetometers 10, 12, and 14 over exactly one revolution are used by signal processing unit 4 in the equations above to solve for the coefficients $A_{12}$, $A_{22}$, $A_{32}$, and $\{e/b_{cm}\}$. Note determination of $\{e/b_{cm}\}$ supplies redundant information obtained in the previous two steps.

Processor unit 4 stores the values of the elements of the [A] and $\{e/b_{cm}\}$ matrices to be utilized by signal processing unit 4 to compensate for local distortions and local independent sources during magnetic field measuring.

Real Time Compensation for the Distortion of the Earth's magnetic field

As described above, the instrument calibration routine provides values for the distortion matrix [A] and the contribution to the magnetic field from the independent sources $\{e/b_{cm}\}$. These numbers are independent of geographic location and are constant for the particular system calibrated.

Real time correction of the magnetic field measurements at any geographic location, $\{h/b_{cm}\}$, is realized by programming microprocessor unit 20 to perform the following matrix multiplication:

$$\{b/b_{cp}\} = [A]^{-1}\{h/b_{cm} - e/b_{cm}\}$$

using $\{h/b_{cm}\}$ generated by signal processing unit 4 from the outputs of magnetometers 10, 12, and 14. The resultant value for $\{b/b_{cp}\}$ is the undistorted Earth's magnetic field vector at the measurement location scaled with respect to the field strength, $b_{cp}$, where the system was calibrated. If $b_{cp}$ was measured at the system calibration location using standard instrumentation, then b can be calculated in the microprocessor from:

$$[b] = b_{cp}\{b/b_{cp}\}$$

For compass applications, only the unit vector along b is needed and can be found by normalizing $\{b/b_{cp}\}$ with the microprocessor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A magnetic field measuring system for generating a system output signal representative of the undistorted magnetic field at any spatial location over a measurement period, wherein said undistorted magnetic field is substantially independent of distortions due to magnetically susceptible material within said magnetic field measuring system and is substantially independent of any internal magnetic field generated by magnetic field sources within said system, said magnetic field measuring system comprising:

A. sensor means for measuring the magnetic field at said location and generating a signal representative thereof, said measured magnetic field corresponding to said undistorted magnetic field as distorted by magnetically susceptible materials within said magnetic field measuring system and by any internal magnetic field generated by magnetic field sources within said magnetic field measuring system;

B. signal processing means coupled to said sensor means for processing said signal representative of said measured magnetic field to generate said system output signal, said signal processing means including:

i. evaluation means for evaluating the relationship:

$$\{b\} = [B]^{-1}\{h - e\}$$

where
$\{b\}$ is a matrix representation of said undistorted magnetic field;
$\{h\}$ is a matrix representation of said measured magnetic field;
$\{e\}$ is a matrix representation of said distortions in said measured magnetic field due to said internal magnetic field sources;
[B] is a matrix representation of the coefficients corresponding to the effect of said magnetically susceptible materials on said undistorted magnetic field; and said magnetic field measuring system being operative over said measurement period at said spatial location, wherein the distribution of magnetically susceptible material within said magnetic field measuring system and the number, location and intensity of said internal magnetic sources are substantially constant over said measuring period.

2. The system of claim 1 further comprising:

i. means for generating a coefficients signal representative of the coefficients corresponding to the effect of said magnetically susceptible materials on said undistorted magnetic field;

ii. means for generating a signal representative of distortions in the measured magnetic field due to said internal magnetic field sources; and wherein said evaluation means is responsive to said coefficients signal and said signal representative of distortions in the measured magnetic field due to said internal magnetic field sources.

3. The system of claim 1 wherein said sensor means further includes means for providing three signals, each signal being representative of said distorted magnetic field along an associated one of three substantially orthogonal axes at said spatial location.

4. The system of claim 3 wherein said sensor means further includes:

a first measuring means for generating a signal representative of said distorted magnetic field at said spatial location substantially along a first axis;

a second measuring means for generating a signal representative of said distorted magnetic field at said spatial location substantially along a second axis; and a third measuring means for generating a signal representative of said distorted magnetic field at said spatial location substantially along a third axis;

wherein said first, second and third axes are substantially orthogonal.

5. The system of claim 4 wherein:

said first measuring means includes a first magnetometer;

said second measuring means includes a second magnetometer; and said third measuring means includes a third magnetometer;

wherein said first, second and third magnetometers have their respective sensing axes positioned in a substantially orthogonal relationship.

6. The system of claim 1 wherein said magnetically susceptible material includes materials having a magnetic susceptibility greater than zero.

7. The system of claim 1 wherein said magnetically susceptible material includes materials having a magnetic susceptibility less than zero.

8. The system of claim 1 wherein said magnetically susceptible material includes iron.

9. The system of claim 1 wherein said magnetically susceptible material includes materials having magnetic properties substantially similar to iron.

10. The system of claim 3 wherein said sensor means further includes means for providing three signals, each signal being representative of said distorted magnetic field along an associated one of three substantially orthogonal axes at said spatial location.

11. The system of claim 10 wherein said sensor means further includes:
a first measuring means for generating a signal representative of said distorted magnetic field at said spatial location substantially along a first axis;
a second measuring means for generating a signal representative of said distorted magnetic field at said spatial location substantially along a second axis; and
a third measuring means for generating a signal representative of said distorted magnetic field at said spatial location substantially along a third axis;
wherein said first, second and third axes are substantially orthogonal.

12. The system of claim 11 wherein:
said first measuring means includes a first magnetometer;
said second measuring means includes a second magnetometer; and
said third measuring means includes a third magnetometer;
wherein said first, second and third magnetometers have their respective sensing axes positioned in a substantially orthogonal relationship.

13. A method for measuring the undistorted magnetic field at any spatial location over a measurement period and for generating an output signal representative thereof, said undistorted magnetic field being substantially independent of distortions due to magnetically susceptible material within the apparatus used for said measuring method and being substantially independent of any internal magnetic field which is generated by any magnetic field sources within the apparatus used for said measuring method, said method comprising the steps of:
measuring the distorted magnetic field at said spatial location and generating a signal representative thereof, wherein said distorted magnetic field corresponds to said undistorted magnetic field, as distorted by magnetically susceptible materials within the apparatus used for said measuring method, and by any internal magnetic field generated by said magnetic field sources;
processing said signal representative of said measured magnetic field to generate said output signal representative of said undistorted magnetic field;
wherein said processing step includes evaluating the relationship of:

$\{b\} = [B]^{-1}\{h-e\}$ where:
$\{b\}$ is a matrix representation of said undistorted magnetic field;
$\{h\}$ is a matrix representation of said signal representative of said measured magnetic field;
$\{e\}$ is a matrix representation of said signal representative of said distortions in said measured magnetic field due to said internal magnetic field sources;
$[B]$ is a matrix representation of said signal representative of the coefficients corresponding to the effect of said magnetically susceptible materials in said apparatus on said undistorted magnetic field; and
said steps being performed during said measurement period at said spatial location, wherein the distribution of said magnetically susceptible material within said apparatus and, the number, location and intensity of said internal magnetic sources are substantially constant over said measurement period.

14. The method of claim 13 wherein said processing step includes the further steps of:
i. generating a coefficients signal representative of the coefficients corresponding to the effect of said magnetically susceptible materials on said undistorted magnetic field;
ii. generating a signal representative of distortions in the measured magnetic field due to said internal magnetic field sources;
said evaluating step using said signals generated in steps i and ii.

15. A method for measuring the Earth's magnetic field at any given location comprising the steps of:
A. calibrating a measurement system having three magnetic field sensors, each magnetic field sensor having its sensing axis aligned with a respective one of three orthogonal axes, each magnetic field sensor including means for producing an output signal indicative of the magnetic field measured along its respective sensing axis, and having a signal processor coupled to the outputs of said sensors, by:
i. placing said measurement system in a first geographic location having a magnetic field of known value,
ii. employing said signal processor to evaluate the expression $\{b\} = [B]^{-1}\{h-e\}$ where
$\{b\}$ is a matrix representation of the Earth's magnetic field at said first geographic location;
$\{h\}$ is a matrix representation of a signal representative of said measured magnetic field at said first geographic location;
$\{e\}$ is a matrix representation of distortion by magnetic fields resulting from any magnetic sources within said measuring system;
$[B]$ is a matrix representation of coefficients expressing the effect on the measured magnetic field of magnetically susceptible materials within said measuring system, and
iii. storing in said signal processor the values derived from said evaluation for $\{e\}$, and $[B]$, and
B. measuring with said measuring system the magnetic field at a second geographic location different from said first geographic location and employing said stored values together with the measured value of the magnetic field at said second geographic location to generate an output signal representative of the Earth's magnetic field at said second geographic location.

16. A method for measuring the direction of the Earth's magnetic field at any given location comprising the steps of:

A. calibrating a measurement system having three magnetic field sensors, each magnetic field sensor having its sensing axis aligned with a respective one of three orthogonal axes, each magnetic field sensor including means for producing an output signal indicative of the magnetic field measured along its respective sensing axis, and having a signal processor coupled to the outputs of said sensors, by:

i. placing said measurement system in a first geographic location having a magnetic field of known value, ii. employing said signal processor to evaluate the expression $$\{b/b_c\} = [B]^{-1}\{h/b_c - e/b_c\}$$

where:

{$b/b_c$} is a matrix representation of the direction of the Earth's magnetic field at said first geographic location;

{$h/b_c$} is a matrix representation of a signal representative of said measured magnetic field at said first geographic location;

{$e/bc$} is a matrix representation of distortion by magnetic fields resulting from any magnetic sources within said measuring system;

where {b}, {h} and {e}, are all scaled with respect to the field strength, $b_c$, at the first geographic location and {$b/b_c$} is a unit vector.

[B] is a matrix representation of coefficients expressing the effect on the measured magnetic field of magnetically susceptible materials within said measuring system, and iii. storing in said signal processor the values derived from said evaluation for {e/bc}, and {B}, and B. measuring with said measuring system the magnetic field at a second geographic location different from said first geographic location and employing said stored values together with the measured value of the magnetic field at said second geographic location to generate an output signal representative of the direction of the Earth's magnetic field at said second geographic location, wherein said processor provides that the resulting matrix {$b/b_c$} represents the field at the second location scaled with respect to the field strength, $b_c$, at said first geographic location, and wherein said processor normalizes {$b/b_c$} to generate a signal representative of a unit vector along the direction of the magnetic field at said second geographic location.

* * * * *